(No Model.)
W. L. STEVENSON.
STOP COCK.
No. 590,691. Patented Sept. 28, 1897.
Fig. I.
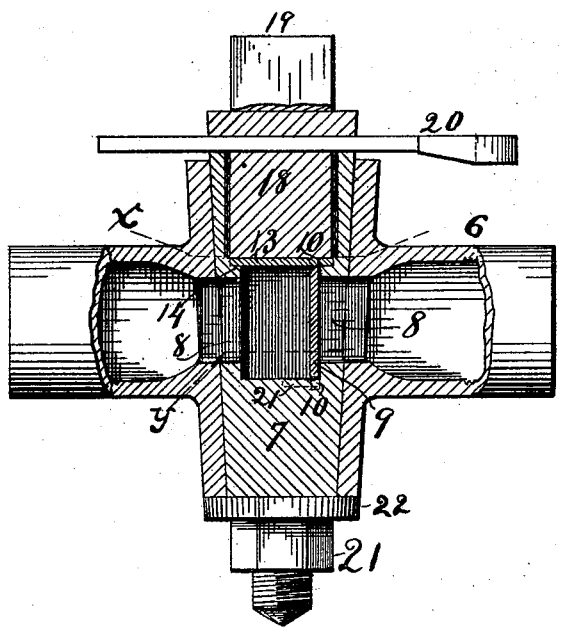
Fig. II.
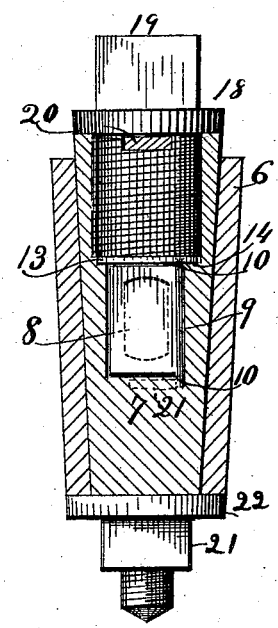
Fig. III.
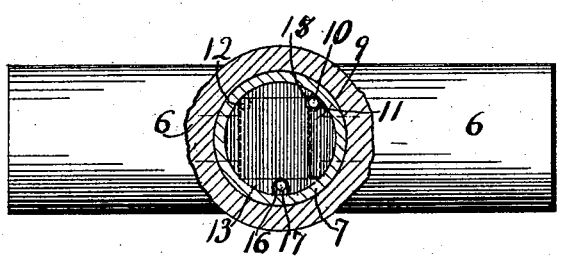
Fig. IV.
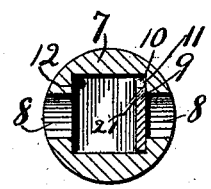
Fig. V.
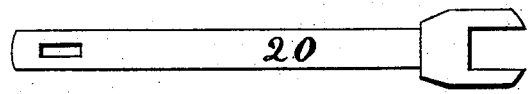
WITNESSES,
N. Stevens
E. A. Egbert
INVENTOR.
William L. Stevenson.
by W. X. Stevens. ATTY.
THE NORRIS PETERS CO., PHOTO-LITHO., WASHINGTON, D. C.

UNITED STATES PATENT OFFICE.

WILLIAM L. STEVENSON, OF SARDIS, OHIO.

STOP-COCK.

SPECIFICATION forming part of Letters Patent No. 590,691, dated September 28, 1897.

Application filed June 7, 1897. Serial No. 639,739. (No model.)

*To all whom it may concern:*

Be it known that I, WILLIAM L. STEVENSON, a citizen of the United States, residing at Sardis, in the county of Monroe and State of Ohio, have invented a new and useful Improvement in Stop-Cocks; and I do hereby declare the following to be a full, clear, and exact description of the same, reference being had to the accompanying drawings, in which—

Figure I is a longitudinal vertical section of a stop-cock according to my invention. Fig. II shows the same in transverse vertical section. Fig. III is a horizontal section at the line $x$, and Fig. IV is a horizontal section at the line $y$, of Fig. I. Fig. V represents the wrench and key in one piece.

This invention relates to that class of stop-cocks which are used to stop or to permit the flow in oil-delivery pipes and other pipes doing similar service; and its object is to adapt a stop-cock to serve as a check-valve through which the oil or other fluid may flow freely in one direction, but which will immediately stop the oil or other fluid if from any cause it starts to return or to flow in the wrong direction.

To this end the invention consists in the construction and combination of parts forming a stop-cock and check-valve hereinafter more fully described, and particularly pointed out in the claims.

6 represents the body portion of the stop-cock, adapted to be inserted at any desired point between the sections of a service-pipe.

7 is the turn-plug, having a tapering fit through the body 6 and a transverse passage 8 to register with the pipe when turned open, as in Fig. I. The plug 7 is also chambered to receive a valve 9, which is provided with trunnions 10, projecting from each end at one edge to serve as pivots upon which the valve swings, and the two sides of the chamber which surround the passage 8 are faced like a door-jamb to serve as seats for the valve 9, the valve being fitted to have its lower trunnion stepped in either of the bearings 11 or 12.

13 is a disk fitted into an enlarged opening in the top of the plug to rest on a shoulder 14 thereof and provided with an aperture 15 to serve as the bearing for the upper trunnion 10. This disk 13 is further notched or perforated at 16 to admit and rest over a stud 17, which is fixed in the body at the shoulder 14 to keep the disk in place. The stud 17 is located half-way between the two side openings of the passage 8, so that by inverting the disk one way or the other its perforation 16 will be located directly over either of the bearings 11 or 12, thus serving as the upper bearing for the valve when the latter is located at either of its seats, so that without turning the plug around its valve may be set to open inward at either side of the plug, and in order to obtain ready access to the valve a cap 18 is screwed into the enlargement over the disk 13, and the head 19 of this cap being squared to receive a wrench for turning the plug 7 when it is desired to stop the passage 8 the cap and the body 6 are transversely perforated to receive the body of a wrench 20, which in this instance serves as a key to secure the cap with the body, so that both shall be turned together.

21 represents a light spring fitted to act between the valve and the body to keep the valve normally closed upon the adjacent seat, but this spring is so light that a very little pressure of oil or other fluid on the outer face of the valve will open the same inward and permit free passage of the fluid, but when the flow of fluid is stopped from any cause the spring will close the valve, causing it to serve as a check against any backward flow of the fluid.

The wrench 20 is fitted to engage a flattened or squared portion of the projecting lower end of the plug to assist in manipulating it. The plug may be provided with any usual nut 21 and washer 22 for drawing in the plug to tighten it in case of wear. This plug may be turned to face its valve either way, and if the valve should become worn and leaky by long service it may be changed to the opposite seat, thus doubling the length of its service, and by removing the cap 18 this change may be made in a few minutes without disconnecting the service-pipe. The valve swings like a door entirely out of the line of the pipe, having a straight-line passage for the fluid through the plug. The spring might be dispensed with in some cases without departing from the principle of this invention.

Having thus fully described my invention, what I believe to be new, and desire to secure by Letters Patent, is the following:

1. In stop-cocks, a chambered turn-plug having a valve-seat and valve-bearings at each of two opposite sides of the chamber, and a valve provided with pivots and a spring to fit either of the bearings, the two faces of the valve being fitted to the two valve-seats, respectively.

2. In stop-cocks, a chambered turn-plug having a passage transversely through it, and a valve-seat and bearing within the chamber at each end of the passage, the plug having an enlarged opening and a shoulder above the said chamber, and a stud-pin fixed in the shoulder; a disk fitted to rest upon the shoulder and perforated as a bearing for a valve, also perforated or notched to engage the said stud-pin, and a valve having trunnions to pivotally engage the above-named bearings, substantially as described.

3. In stop-cocks, a chambered turn-plug having a passage transversely through it, and a valve-seat and bearing at each end of the passage; a valve having pivots and fitted to engage either of the seats; a stud-pin fixed in the plug, and a disk notched or perforated to invertibly engage both the said stud and one of the valve-pivots, substantially as described, whereby the disk is fitted to serve as one bearing for the valve, whether the valve be located at one or the other of its seats.

4. In stop-cocks, a body portion, a chambered plug fitted to turn in the body and having two valve-seats within the chamber; a valve fitted to engage either seat; a disk fitted to serve as one bearing for the valve in either of its positions in the plug, and a cap above the disk, substantially as described.

In testimony whereof I affix my signature in presence of two witnesses.

WILLIAM L. STEVENSON.

Witnesses:
SUSAN P. WOOD,
MAHALA WOOD.